United States Patent
Koc et al.

(10) Patent No.: US 9,609,565 B2
(45) Date of Patent: Mar. 28, 2017

(54) MECHANISM TO ENABLE WIFI OFFLOAD BASED ON POWER PREFERENCE OF USER EQUIPMENT

(71) Applicant: Intel Corporation, Santa Clara, CA (US)

(72) Inventors: Ali Koc, Portland, OR (US); Maruti Gupta, Portland, OR (US); Satish Chandra Jha, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 14/109,283

(22) Filed: Dec. 17, 2013

(65) Prior Publication Data

US 2014/0362689 A1 Dec. 11, 2014

Related U.S. Application Data

(60) Provisional application No. 61/832,644, filed on Jun. 7, 2013.

(51) Int. Cl.
*H04W 52/02* (2009.01)
*H04W 36/22* (2009.01)
(Continued)

(52) U.S. Cl.
CPC .......... *H04W 36/22* (2013.01); *H04L 5/0032* (2013.01); *H04L 5/0055* (2013.01); *H04L 5/14* (2013.01);
(Continued)

(58) Field of Classification Search
None
See application file for complete search history.

(56) References Cited

U.S. PATENT DOCUMENTS 6,275,712 B1  8/2001  Gray et al.
9,215,637 B2  12/2015  Ramamurthi et al.
(Continued)

FOREIGN PATENT DOCUMENTS

CN  103038651 A  4/2013
CN  105164949 A  12/2015
(Continued)

OTHER PUBLICATIONS

"Backhaul Considerations for User Plane Architectures for Dual Connectivity", Qualcomm Incorporated, R2-131158, 3GPP TSG-RAN2 #81bis, Chicago, USA, [Online] retrieved from the internet: <http://www.3gpp.org/f tp/tsg_ran/wg2_r12/TSGR2_81bis/Docs/>, (Apr. 15-19, 2013), 1-3.
(Continued)

*Primary Examiner* — Brandon Renner
(74) *Attorney, Agent, or Firm* — Schwegman Lundberg & Woessner, P.A.

(57) ABSTRACT

In typical UEs, scanning for WiFi access points (APs) can consume a significant amount of power. This scanning occurs when the UE is connected through the cellular network, but does not occur when the UE is connected to a WiFi network. As a result, offloading a UE from a cellular network to a WiFi network can allow the UE to conserve power. An issue with existing cellular networks is that the UE cannot inform a cellular network that the UE is running low on power, and therefore cannot direct the cellular network to offload the UE for power conservation reasons. A technique discussed herein allows the UE to indicate its power saving needs to the cellular network. In response, the cellular network can lower (or raise) a particular threshold, so that the UE now exceeds (or no longer exceeds) the threshold, and initiates offloading.

20 Claims, 5 Drawing Sheets

(51) Int. Cl.

| | | |
|---|---|---|
| *H04W 28/02* | (2009.01) | |
| *H04N 21/24* | (2011.01) | |
| *H04W 28/08* | (2009.01) | |
| *H04L 5/00* | (2006.01) | |
| *H04L 5/14* | (2006.01) | |
| *H04W 72/04* | (2009.01) | |
| *H04W 36/30* | (2009.01) | |
| *H04N 21/262* | (2011.01) | |
| *H04W 36/24* | (2009.01) | |
| *H04L 29/06* | (2006.01) | |
| *H04W 8/00* | (2009.01) | |
| *H04W 12/04* | (2009.01) | |
| *H04W 36/14* | (2009.01) | |
| *H04W 36/36* | (2009.01) | |
| *H04W 84/12* | (2009.01) | |
| *H04W 92/18* | (2009.01) | |

(52) U.S. Cl.
CPC ......... *H04L 63/0442* (2013.01); *H04N 21/24* (2013.01); *H04N 21/2401* (2013.01); *H04N 21/26208* (2013.01); *H04W 8/005* (2013.01); *H04W 12/04* (2013.01); *H04W 28/0289* (2013.01); *H04W 28/085* (2013.01); *H04W 36/24* (2013.01); *H04W 36/30* (2013.01); *H04W 52/0212* (2013.01); *H04W 72/0406* (2013.01); *H04W 28/08* (2013.01); *H04W 36/14* (2013.01); *H04W 36/36* (2013.01); *H04W 84/12* (2013.01); *H04W 92/18* (2013.01); *Y02B 60/50* (2013.01)

(56) References Cited

U.S. PATENT DOCUMENTS

| | | | |
|---|---|---|---|
| 9,288,734 | B2 | 3/2016 | Jha et al. |
| 9,326,207 | B2 | 4/2016 | Jha et al. |
| 2003/0165150 | A1 | 9/2003 | Zimmermann et al. |
| 2005/0185651 | A1 | 8/2005 | Rinne |
| 2005/0202823 | A1* | 9/2005 | Shaheen ............ H04W 36/0061 455/436 |
| 2005/0262261 | A1 | 11/2005 | Deshpande |
| 2006/0019662 | A1 | 1/2006 | Andrews et al. |
| 2006/0223465 | A1 | 10/2006 | Akiba et al. |
| 2007/0025304 | A1 | 2/2007 | Leelahakriengkrai et al. |
| 2007/0076671 | A1 | 4/2007 | Winget et al. |
| 2008/0095119 | A1* | 4/2008 | Bachmann ............ H04W 28/16 370/332 |
| 2008/0159232 | A1 | 7/2008 | Thalanany et al. |
| 2008/0220788 | A1 | 9/2008 | Stanwood et al. |
| 2009/0111468 | A1 | 4/2009 | Burgess et al. |
| 2009/0113086 | A1 | 4/2009 | Wu et al. |
| 2009/0124245 | A1 | 5/2009 | Somasundaram et al. |
| 2009/0285163 | A1 | 11/2009 | Zhang et al. |
| 2010/0023830 | A1 | 1/2010 | Wengerter et al. |
| 2010/0135166 | A1 | 6/2010 | Ahluwalia |
| 2010/0169732 | A1 | 7/2010 | Wu |
| 2010/0275083 | A1 | 10/2010 | Nam et al. |
| 2010/0316096 | A1 | 12/2010 | Adjakple et al. |
| 2010/0329198 | A1 | 12/2010 | Madan et al. |
| 2011/0002221 | A1 | 1/2011 | Turk et al. |
| 2011/0051654 | A1 | 3/2011 | Blankenship et al. |
| 2011/0053585 | A1 | 3/2011 | Otonari |
| 2011/0090802 | A1 | 4/2011 | Kotrla et al. |
| 2011/0113299 | A1 | 5/2011 | Power et al. |
| 2011/0136446 | A1 | 6/2011 | Komninakis et al. |
| 2011/0141952 | A1 | 6/2011 | Wang et al. |
| 2011/0237272 | A1 | 9/2011 | Gorokhov et al. |
| 2011/0249619 | A1 | 10/2011 | Yu et al. |
| 2011/0261750 | A1 | 10/2011 | Fujito et al. |
| 2011/0310816 | A1 | 12/2011 | Kim et al. |
| 2011/0317560 | A1 | 12/2011 | Aramoto et al. |
| 2012/0057478 | A1 | 3/2012 | Brännström et al. |
| 2012/0076040 | A1* | 3/2012 | Hoshino et al. ............... 370/252 |
| 2012/0087275 | A1 | 4/2012 | Zhang et al. |
| 2012/0131204 | A1 | 5/2012 | Song |
| 2012/0178441 | A1 | 7/2012 | Shaheen et al. |
| 2012/0269140 | A1 | 10/2012 | Nam et al. |
| 2012/0315905 | A1* | 12/2012 | Zhu ........................ H04W 36/36 455/436 |
| 2013/0003697 | A1 | 1/2013 | Adjakple et al. |
| 2013/0021991 | A1 | 1/2013 | Ko et al. |
| 2013/0028165 | A1 | 1/2013 | Kim et al. |
| 2013/0077543 | A1 | 3/2013 | Kim et al. |
| 2013/0083721 | A1 | 4/2013 | Wu et al. |
| 2013/0114575 | A1 | 5/2013 | Fu et al. |
| 2013/0142136 | A1 | 6/2013 | Pi et al. |
| 2013/0166644 | A1 | 6/2013 | Sun et al. |
| 2013/0176988 | A1 | 7/2013 | Wang et al. |
| 2013/0272169 | A1 | 10/2013 | Wang et al. |
| 2013/0308473 | A1 | 11/2013 | Sun et al. |
| 2013/0325684 | A1 | 12/2013 | Vogler et al. |
| 2013/0343252 | A1* | 12/2013 | Chakraborty et al. ........ 370/311 |
| 2013/0343293 | A1 | 12/2013 | Jersenius et al. |
| 2014/0029581 | A1 | 1/2014 | Schatzmayr |
| 2014/0036873 | A1* | 2/2014 | Cheng et al. .................. 370/331 |
| 2014/0064292 | A1 | 3/2014 | Binetti et al. |
| 2014/0122656 | A1 | 5/2014 | Baldwin et al. |
| 2014/0171069 | A1* | 6/2014 | Pang et al. .................. 455/432.1 |
| 2014/0204771 | A1 | 7/2014 | Gao et al. |
| 2014/0287717 | A1* | 9/2014 | Golaup et al. ................ 455/411 |
| 2014/0301241 | A1 | 10/2014 | Kumar et al. |
| 2014/0302853 | A1* | 10/2014 | Militano et al. ............... 455/436 |
| 2014/0362704 | A1 | 12/2014 | Jha et al. |
| 2014/0362745 | A1 | 12/2014 | Davydov et al. |
| 2014/0362752 | A1 | 12/2014 | Jha et al. |
| 2014/0362829 | A1 | 12/2014 | Kazmi et al. |
| 2014/0362832 | A1 | 12/2014 | Rudolf et al. |
| 2014/0366069 | A1 | 12/2014 | Ramamurthi et al. |
| 2014/0370906 | A1 | 12/2014 | Lundborg et al. |
| 2015/0020157 | A1 | 1/2015 | Kim et al. |
| 2015/0056992 | A1 | 2/2015 | Morita |
| 2015/0109993 | A1 | 4/2015 | Kojima |
| 2015/0133137 | A1 | 5/2015 | Lee et al. |
| 2015/0156743 | A1 | 6/2015 | Lee et al. |
| 2015/0237644 | A1 | 8/2015 | Golitschek Edler et al. |
| 2015/0270877 | A1 | 9/2015 | Hessler et al. |
| 2015/0296440 | A1* | 10/2015 | Forssell ................ H04W 48/08 370/329 |
| 2015/0358111 | A1 | 12/2015 | Marinier et al. |
| 2016/0119873 | A1* | 4/2016 | Dai .................... H04W 52/0229 370/311 |
| 2017/0006659 | A1 | 1/2017 | Jha et al. |

FOREIGN PATENT DOCUMENTS

| | | | |
|---|---|---|---|
| CN | 105165096 A | 12/2015 | |
| CN | 105191418 A | 12/2015 | |
| CN | 105230085 A | 1/2016 | |
| CN | 105247919 A | 1/2016 | |
| EP | 1439725 A1 | 7/2004 | |
| EP | 2413635 A1 | 2/2012 | |
| KR | 1020110071406 A | 6/2011 | |
| TW | 201505461 A | 2/2015 | |
| TW | 201517645 A | 5/2015 | |
| WO | WO-2011100492 A1 | 8/2011 | |
| WO | WO-2012053840 A2 | 4/2012 | |
| WO | WO-2012153961 A2 | 11/2012 | |
| WO | WO-2013051975 A1 | 4/2013 | |
| WO | WO2014049198 A1 * | 9/2013 | ........ H04W 52/0212 |
| WO | WO-2014197493 A1 | 12/2014 | |
| WO | WO-2014197501 A1 | 12/2014 | |
| WO | WO-2014197571 A1 | 12/2014 | |
| WO | WO-2014197576 A1 | 12/2014 | |
| WO | WO-2014197682 A1 | 12/2014 | |
| WO | WO-2014197719 A1 | 12/2014 | |

OTHER PUBLICATIONS

"Correction on implicit HARQ-ACK Resource Determination for PUCCH for Mat 1b with Channel Selection for TDD CA with

(56) References Cited

OTHER PUBLICATIONS

Different UL-DL Configurations", CATT, R1-132691, 3GPP TSG-RAN WG1 Meeting #73, Fukuoka, Japan, (May 20, 2013), 2-4.
"Correction on UARQ-ACK Transmission for a UE con figured with PUCCH Format 3", Intel Corporation, R1-132684, 3GPP TSG-WG1 Meeting #73, Fukuoka, Japan, (May 20, 2013), 4-5.
"Discussion on S1 split for dual-connectivity", Interdigital Communications, R2-131326, 3GPP TSG-RAN WG2 #81bis, Chicago. USA, [Online] retrieved from the internet: <http://www.3gpp.org/ftp/tsg_ran/wg2_rl2/TSGR2_81bis/Docs/>, (Apr. 15-19, 2013).
"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10., (Jul. 2012), 210 pgs.
"Evolved Universal Terrestrial Radio Access (E-UTRA); Radio Resource Control (RRC); Protocol specification", 3GPP TS 36.331 version 10.6.0 Release 10., (Jul. 2012), 306 pgs.
"Evolved Universal Terrestrial Radio Access Network (E-UTRAN): Architecture description", 3GPP TS 36.401 version 10.4.0 Release 10, (2012), 22 pgs.
"International Application Serial No. PCT/US2014/040734, International Search Report mailed Sep. 12, 2014", 5 pgs.
"International Application Serial No. PCT/US2014/040734, Written Opinion mailed Sep. 12, 2014", 8 pgs.
"International Application Serial No. PCT/US2014/040743, International Search Report mailed Sep. 24, 2014", 3 pgs.
"International Application Serial No. PCT/US2014/040743, Written Opinion mailed Sep. 24, 2014", 5 pgs.
"International Application Serial No. PCT/US2014/040877, International Search Report mailed Sep. 25, 2014", 4 pgs.
"International Application Serial No. PCT/US2014/040877, Written Opinion mailed Sep. 25, 2014", 4 pgs.
"International Application Serial No. PCT/US2014/040882, International Search Report mailed Sep. 25, 2014", 3 pgs.
"International Application Serial No. PCT/US2014/040882, Written Opinion mailed Sep. 25, 2014", 5 pgs.
"International Application Serial No. PCT/US2014/041068, International Search Report mailed Sep. 26, 2014", 3 pgs.
"International Application Serial No. PCT/US2014/041068, Written Opinion mailed Sep. 26, 2014", 5 pgs.
"International Application Serial No. PCT/US2014/041142, International Search Report mailed Oct. 1, 2014", 3 pgs.
"International Application Serial No. PCT/US2014/041142, Written Opinion mailed Oct. 1, 2014", 6 pgs.
"Mobility for dual connectivity", R2-130990, 3GPP TSG RAN WG2 Meeting #81bis, (2013).
"Power Preference Indication and Qos Requirements", ZTE Corporation, R2-130131 in 3GPP TSG-RAN WG2 Meeting #81 St Julians. Malta, (Jan. 28-Feb. 1, 2013).
"Radio link failure handling for dual connectivity", R2-131990, 3GPP TSG RAN WG2 Meeting #82, (May 2013), 1-2.
"Resource Coordination for Small Cells with Non-Ideal Backhaul", Samsung, R1-131027, 3GPP TSG RAN WG1 #72bis, Chicago, USA, (Apr. 15, 2013), 1-2.
"Transparent End-to-End Packet-Switched Streaming Service(PSS):Progressive Download and Dynamic Adaptive Streaming over HTTP(3GP-DASH)", 3GPP TS 26.247 V 11.5.0 Release 11, (2013), 119 pgs.
"UP Radio Procotol for Dual Connecivity", LG Electronics Inc., R2-131231, 3GPP TSG-RAN2 Meeting #81bis, (Apr. 2013), 1-7.
"User Plane Architecture for Dual-Connectivity", R2-131939, 3GPP TSG-RAN WG2 #82, (May 2013).
Andrews, M., et al., "Optimal utility based multi-user throughput allocation subject to throughput constraints", IEEE INFOCOM vol. 4, (2005), 2415-2424.
Jalali, A, et al., "Data throughput of CDMA-HDR a high efficiency-high data rate personal communication wireless system", IEEE 51st Vehicular Technology Conference vol. 03, (2000), 1854-1858.

Liu, X., et al., "A framework for opportunistic scheduling in wireless networks", Computer Networks vol. 41, (2003), 451-475.
Lui, X., et al., "Opportunistic transmission scheduling with resource-sharing constraints in wireless networks", IEEE Selected Areas in Communications vol. 19 (10), (2006), 2053-2064.
Singh, S., et al., "Video capacity and QoE enhancements over LTE", IEEE International Conference on Communications (ICC), (2012), 7071-7076.
Stolyar, A. L., "On the Asymptotic Optimalityof the Gradient Scheduling Algorithm for Multiuser Throughput Allocation", Operations Research vol. 53, (2005), 12-25.
"U.S. Appl. No. 14/104,725, Restriction Requirement mailed Aug. 4, 2015", 9 pgs.
"U.S. Appl. No. 14/134,985, Non Final Office Action mailed Sep. 1, 2015", 30 pgs.
"U.S. Appl. No. 14/137,243, Non Final Office Action mailed Jul. 7, 2015", 11 pgs.
"U.S. Appl. No. 14/140,827, Non Final Office Action mailed Aug. 13, 2015", 16 pgs.
"U.S. Appl. No. 14/140,827, Response filed Jun. 19, 2015 to Restriction Requirement mailed Apr. 20, 2015", 8 pgs.
"U.S. Appl. No. 14/140,827, Restriction Requirement mailed Apr. 20, 2015", 7 pgs.
"U.S. Appl. No. 14/141,940, Examiner Interview Summary mailed Jul. 29, 2015", 3 pgs.
"U.S. Appl. No. 14/141,940, Non Final Office Action mailed May 22, 2015", 23 pgs.
"U.S. Appl. No. 14/141,940, Notice of Allowability mailed Sep. 8, 2015", 2 pgs.
"U.S. Appl. No. 14/141,940, Notice of Allowance mailed Aug. 10, 2015", 9 pgs.
"U.S. Appl. No. 14/141,940, Response filed Jul. 7, 2015 to Non Final Office Action mailed May 22, 2015", 23 pgs.
"Issues on extended paging cycle in RRC_IDLE", LG Electronics Inc. 3GPP TSG-RAN WG2 #82 R2-131890, (May 20-24, 2013), 3 pgs.
"U.S. Appl. No. 14/104,725, Non Final Office Action mailed Jan. 15, 2016", 12 pgs.
"U.S. Appl. No. 14/134,985, Response filed Dec. 22, 2015 to Non Final Office Action mailed Sep. 1, 2015", 30 pgs.
"U.S. Appl. No. 14/137,243, Notice of Allowance mailed Nov. 4, 2015", 11 pgs.
"U.S. Appl. No. 14/137,243, Response filed Oct. 8, 2015 to Non Final Office Action mailed Jul. 8, 2015", 9 pgs.
"U.S. Appl. No. 14/140,827, Notice of Allowance mailed Dec. 23, 2015", 9 pgs.
"U.S. Appl. No. 14/140,827, Response filed Nov. 12, 2015 to Non Final Office Action mailed Aug. 13, 2015", 17 pgs.
"Application Serial No. PCT/US2014/040882, International Preliminary Report on Patentability mailed Dec. 17, 2015", 7 pgs.
"Architectures for dual connesctivty", 3GPP TSG RAN WG2 Meeting #81bis, R2-130989, (Apr. 2013), 6 pgs.
"Impacts of Splitting a Single Eps Bearer Between Two (or more) eNBs", 3GPP TSG RAN WG2 Meetin #81bis, R2-131529, (Apr. 2013), 5 pgs.
"International Application Serial No. PCT/US2014/040734, International Preliminary Report on Patentability mailed Dec. 17, 2015", 10 pgs.
"International Application Serial No. PCT/US2014/040743, International Preliminary Report on Patentability mailed Dec. 17, 2015", 7 pgs.
"International Application Serial No. PCT/US2014/040877, International Preliminary Report on Patentability mailed Dec. 17, 2015", 6 pgs.
"International Application Serial No. PCT/US2014/041068, International Preliminary Report on Patentability mailed Dec. 17, 2015", 7 pgs.
"International Application Serial No. PCT/US2014/041142, International Preliminary Report on Patentability mailed Dec. 17, 2015", 8 pgs.
"Taiwanese Application Serial No. 103119401, Office Action mailed Aug. 20, 2015", W/ English Search Report, 7 pgs.

(56) References Cited

OTHER PUBLICATIONS

"Taiwanese Application Serial No. 103119401, Response filed Feb. 19, 2016 to Office Action mailed Aug. 20, 2015", (English Translation of Claims), 82 pgs. "Taiwanese Application Serial No. 103119568, Office Action mailed Sep. 22, 2015", W/ English Translation, 13 pgs.

"Taiwanese Application Serial No. 103119568, Office Action mailed Sep. 22, 2015", W/ English Translation, 13 pgs.

"Taiwanese Application Serial No. 103119568, Response filed Dec. 16, 2015 Office Action mailed Sep. 22, 2015", W/ English Claims, 14 pgs.

"U.S. Appl. No. 14/104,725, Notice of Allowability mailed Aug. 4, 2016", 12 pgs.

"U.S. Appl. No. 14/104,725, Notice of Allowance mailed Jul. 15, 2016", 13 pgs.

"U.S. Appl. No. 14/134,985, Advisory Action mailed Jul. 28, 2016", 4 pgs.

"U.S. Appl. No. 14/134,985, Final Office Action mailed Apr. 12, 2016", 26 pgs.

"U.S. Appl. No. 14/104,725, Response filed Apr. 15, 2016 to Non Final Office Action mailed Jan. 15, 2016", 10 pgs.

"U.S. Appl. No. 14/134,985, Response filed Jul. 12, 2016 to Final Office Action mailed Apr. 12, 2016", 16 pgs.

"Taiwanese Application Serial No. 103119568, Office Action mailed Jun. 6, 2016", w/ English Translation, 17 pgs.

"Email Discussion Report on U-Plane Alternatives [81bis#19]", Nokia Siemens Networks (Rapporteur): 3GPP Draft; R2-131621, Retrieved from the Internet: <URL:http://www.3gpp.org/ftpjtsg ran/WG2 RL2/TSGR2 82/Docs/>, (May 10, 2013).

"Email discussion summary on the remaining issues of PUCCH resource and sequence", Email Rapporteur (KDDI)—3GPP TSG RAN WG1 Meeting #70 R1-123240, (Aug. 2012), 28 pgs.

"European Application Serial No. 14807287.9, Communication pursuant to Rule 164(1) EPC mailed Dec. 22, 2016", (Dec. 22, 2016), 12 pgs.

"European Application Serial No. 14807726.6, Extended European Search Report mailed Dec. 23, 2016", 6 pgs.

"European Application Serial No. 14807787.8, Extended European Search Report mailed Jan. 5, 2017", 9 pgs.

"European Application Serial No, 14808206.8, Communication pursuant to Rule 164(1) EPC mailed Feb. 2, 2017", 7 pgs.

"European Application Serial No. 14808258.9, Extended European Search Report mailed Jan. 17, 2017", 8 pgs.

"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.

"Mobile Relay for Evolved Universal Terrestrial Radio Access", 3GPP TR 36.836 V2.0.1- XP05065033, (Oct. 2012), 35 pgs.

"Modeling of constraints from lower-capacity/higher-latency", MediaTek Inc.- 3GPP TSG-RAN WG1 #64 R1-110693, (Feb. 2011), 4 pgs.

"S1 versus X2 Approach for Dual Connectivity", Intel Corporation 3GPF Draft; R2-131403, Retrieved from the Internet: <URL:http://www.3gpp.org/ftpjtsg ran/WG2 RL2/TSGR2 81bis/Docs/>[retrieved on Apr. 6, 2013], (Apr. 2013), 10 pgs.

"Study on Small Cell Enhancements for E-UTRA and E-UTRAN— Higher layer aspects", 3GPP TR 36.842 No. V0.2.0 Release 12, (May 2013), 38 pgs.

* cited by examiner

MECHANISM TO ENABLE WIFI OFFLOAD BASED ON POWER PREFERENCE OF USER EQUIPMENT

PRIORITY APPLICATION

This application claims the benefit of priority to U.S. Provisional Patent Application Ser. No. 61/832,644, filed Jun. 7, 2013, which is incorporated herein by reference in its entirety.

TECHNICAL FIELD

Embodiments pertain to operations and communications performed by electronic devices in wireless networks. Some embodiments relate to determining when to offload a user equipment (UE) from a cellular network onto a WiFi network.

BACKGROUND

A user equipment (UE), such as a cellular telephone, can transmit and receive data over a cellular network. A connection from a UE can be offloaded from the cellular network onto a WiFi network, so that data is sent through the WiFi network rather than the cellular network. Such offloading can ease data transmission through the cellular network, can reduce the user fees associated with data transmission through the cellular network, and can often improve the rate at which data is sent and received from the UE.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In existing cellular networks, the cellular network decides when to offload a user equipment (UE) to a WiFi network. Typically, the cellular network bases a decision to offload on cell loading, availability of operator-deployed access points (APs), and/or received signal strength (RSRP) of various APs. Existing cellular networks do not base the decision to offload on power consumption of the UE.

In typical UEs, scanning for WiFi access points (APs) can consume a significant amount of power. This scanning occurs when the UE is connected through the cellular network, but does not occur when the UE is connected to a WiFi network. As a result, offloading a UE from a cellular network to a WiFi network can allow the UE to stop or reduce its scanning for APs, and can therefore conserve power for the UE.

An issue with existing cellular networks is that the UE cannot inform a cellular network that the UE is running low on power, and therefore cannot direct the cellular network to offload the UE for power conservation reasons. The technique discussed herein addresses this issue, so that a UE can indicate its power saving needs to the cellular network, and the cellular network can respond to initiate offloading. The cellular network can initiate offloading by modifying and/or adjusting its offloading policies accordingly. For instance, the network can lower (or raise) a particular threshold, so that the UE now exceeds (or no longer exceeds) the threshold, and initiates offloading.

Figure 1:
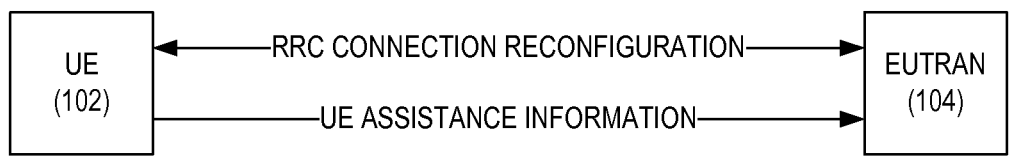
FIG. 1 illustrates an example of a connection between a user equipment (UE) and an Evolved UMTS Terrestrial Radio Access Network (EUTRAN).

FIG. 1 illustrates an example of a connection between a user equipment (UE) 102 and an Evolved UMTS Terrestrial Radio Access Network (EUTRAN) 104. Radio Resource Control (RRC) connection reconfiguration information passes from the UE 102 to the EUTRAN 104 and from the EUTRAN 104 to the UE 102. UE Assistance Information passes from the UE 102 to the EUTRAN 104. FIG. 1 is consistent with 3GPP specification 36.331 v11.3.0.

Figure 2:
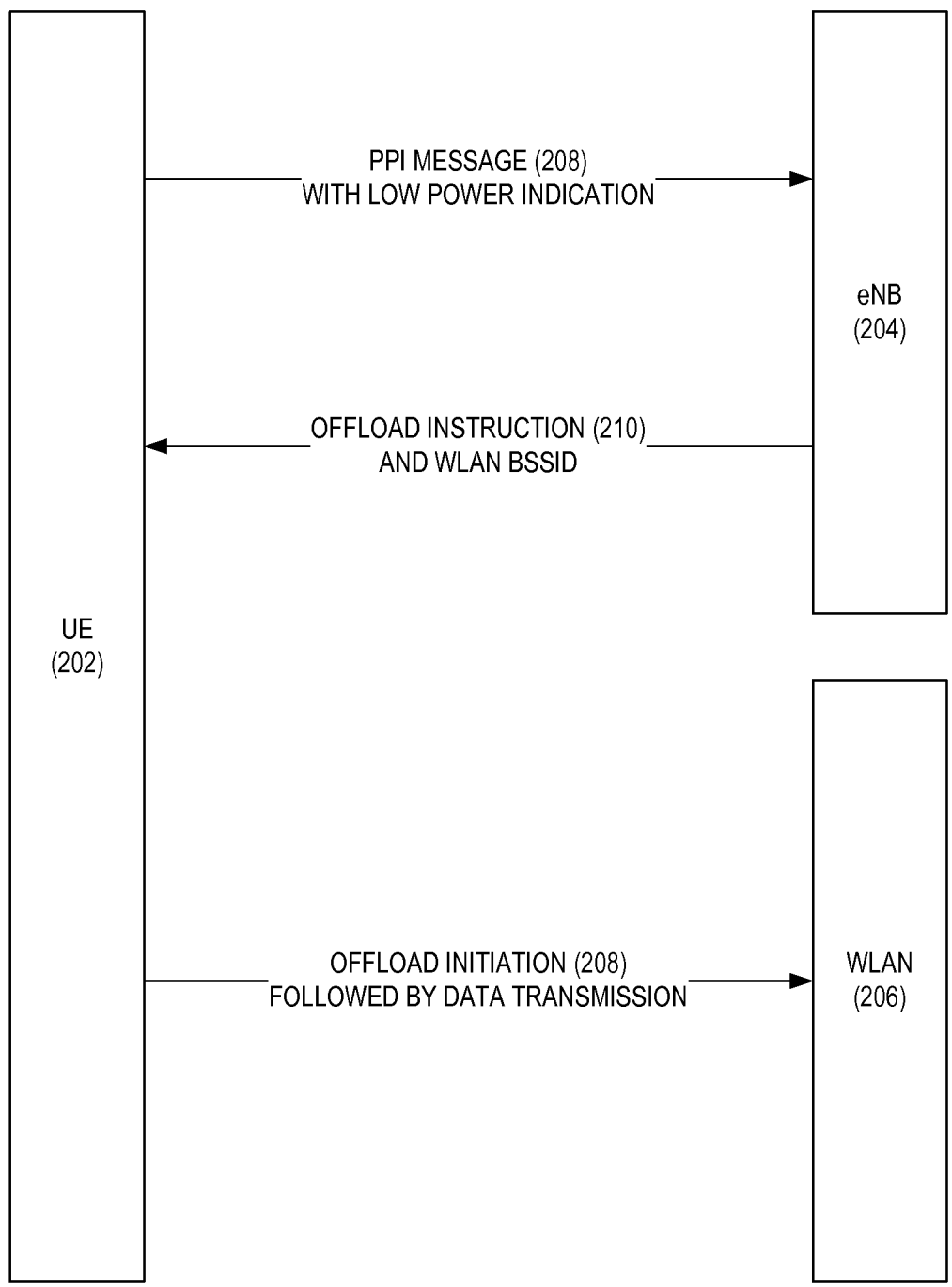
FIG. 2 illustrates an example of a connection scheme that allows a user equipment (UE) to offload from a cellular network to a WiFi network.

FIG. 2 illustrates an example of a connection scheme that allows a user equipment (UE) 202 to offload from a cellular network to a WiFi network. The cellular network communicates to the UE through an evolved NodeB (eNB) 204. The WiFi network communicates to the UE through a Wireless Local Area Network (WLAN) 206.

The UE 202 sends a Power Preference Indication (PPI) message 208 to the eNB 204 to indicate that the UE 202 has a low power. The threshold for low power can include a specified fraction of battery life, a specified time remaining for operation, or other suitable threshold. The PPI message 208 indicates an offloading request to the eNB 204.

In response to the PPI message 208, the eNB 204 can initiate offloading in an offload instruction 210 to the UE 202. The offload instruction 210 can include a command to offload. The offload instruction 210 can also include the basic service set identification (BSSID) of the desired WLAN 206, so that the UE 202 knows where to offload to.

As a mechanism to force the UE 202 to offload, the eNB 204 can adjust its policies. For instance, to initiate offloading, the eNB 204 can temporarily adjust a threshold value for Reference Signal Receive Power (RSRP). The UE 202, which is pre-configured to offload when its RSRP value drops below the threshold, receives the adjusted threshold, determines that it no longer exceeds the threshold, and initiates offloading to the WLAN 206. Temporarily adjusting the RSRP threshold is but one example; the eNB 204 can also change other suitable policies to get the UE 202 to initiate offloading.

In response to the offload instruction 210, the UE 202 can contact the WLAN 206 identified by the BSSID in the offload instruction 210, by sending the identified WLAN 206 an offload initiation 212. The WLAN 206 responds suitably, and connects the UE 202 to the WiFi network. Once the UE 202 is offloaded and connected to the WiFi network through the WLAN 206, the UE 202 can send and receive data through the WiFi network.

The connection scheme of FIG. 2 requires modification to the current 3GPP specification. At present, PPI is used to signal a power preference between a UE and an eNB, but the power preference is not used, in whole or in part, to trigger an offloading event.

In addition to forcing the UE 202 to offload, the eNB 204 can decrease the number of WiFi access points (APs) that the UE 202 needs to scan. Scanning fewer APs can decrease power usage for the UE 202.

There can be four aspects to the connection scheme in FIG. 2. First, the UE sends the PPI to indicate offloading request to the WLAN. Second, the eNB adjusts and changes the policies if the UE sends the PPI. Third, the eNB changes the threshold values for the WLAN offloading after receiving the PPI. Fourth, the eNB decreases the number of APs that UE needs to scan after receiving the PPI. Other aspects are possible as well.

Figure 3:
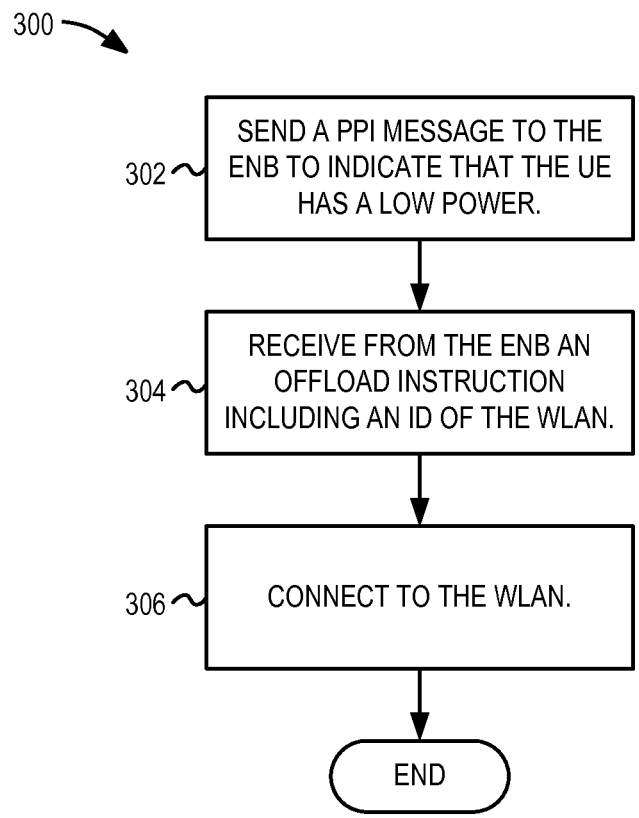
FIG. 3 illustrates a flow chart of an example of a method for initiating offloading from a cellular network to a WiFi network.

FIG. 3 illustrates a flow chart of an example of a method 300 executed by a user equipment (UE) for initiating offloading from a cellular network to a WiFi network. The method 300 can be executed by the UE 102, 202 of FIG. 1 or 2, or by another suitable UE. The cellular network connects through an evolved NodeB (eNB). The WiFi network connects through a Wireless Local Area Network (WLAN). At 302, the method 300 sends a Power Preference Indication (PPI) message to the eNB to indicate that the UE has a low power. At 304, the method 300 receives from the eNB an offload instruction including an identification of the WLAN. At 306, the method 300 connects to the WLAN. This is but one example of a method of initiating offloading; other suitable methods can also be used. Similar methods can be executed by an eNB.

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

Figure 4:
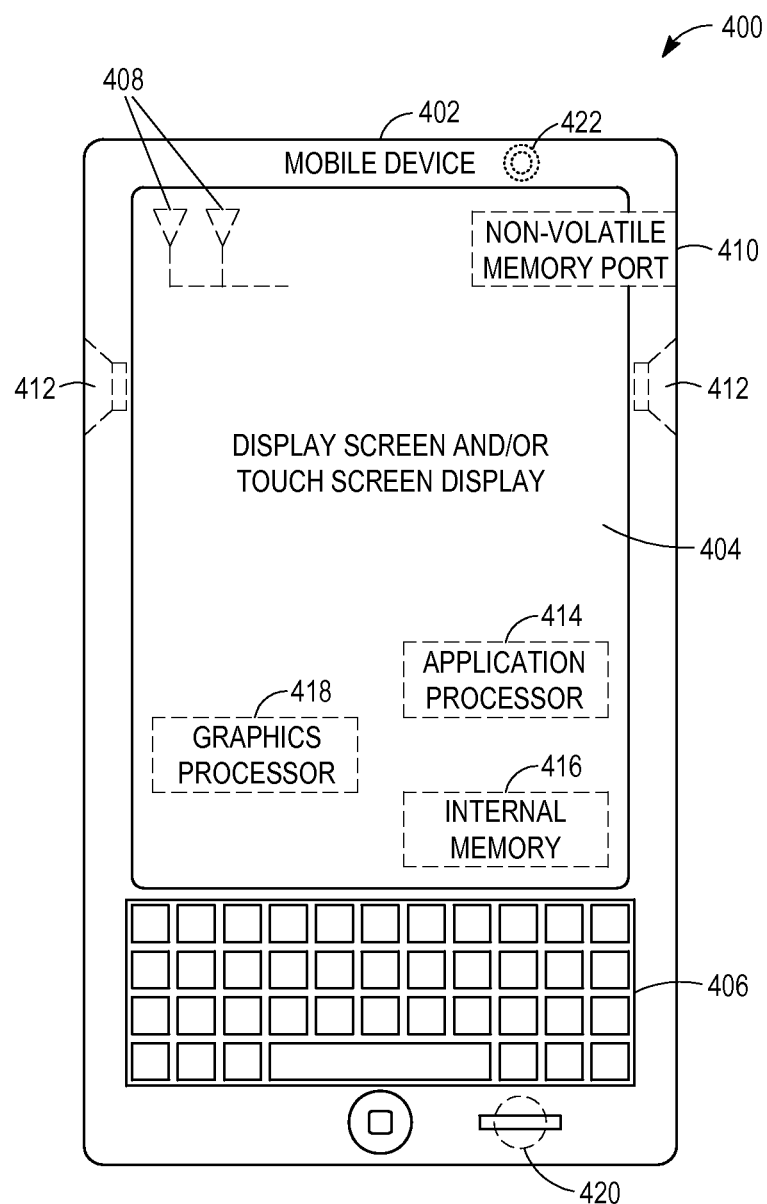
FIG. 4 illustrates an example of a mobile client device on which the configurations and techniques described herein can be deployed.

FIG. 4 illustrates an example of a mobile device 400. The mobile device 400 can be a user equipment (UE), a mobile station (MS), a mobile wireless device, a mobile communication device, a tablet, a handset, or other type of mobile wireless computing device. The mobile device 400 can include one or more antennas 408 within housing 402 that are configured to communicate with a hotspot, base station (BS), an evolved NodeB (eNodeB), or other type of WLAN or WWAN access point. The mobile device 400 can be configured to communicate using multiple wireless communication standards, including standards selected from 4GPP LTE, WiMAX, High Speed Packet Access (HSPA), Bluetooth, and Wi-Fi standard definitions. The mobile device 400 can communicate using separate antennas for each wireless communication standard or shared antennas for multiple wireless communication standards. The mobile device 400 can communicate in a WLAN, a WPAN, and/or a WWAN.

FIG. 4 also shows a microphone 420 and one or more speakers 412 that can be used for audio input and output from the mobile device 400. A display screen 404 can be a liquid crystal display (LCD) screen, or other type of display screen such as an organic light emitting diode (OLED) display. The display screen 404 can be configured as a touch screen. The touch screen can use capacitive, resistive, or another type of touch screen technology. An application processor 414 and a graphics processor 418 can be coupled to internal memory 416 to provide processing and display capabilities. A non-volatile memory port 410 can also be used to provide data input/output options to a user. The non-volatile memory port 410 can also be used to expand the memory capabilities of the mobile device 400. A keyboard 406 can be integrated with the mobile device 400 or wirelessly connected to the mobile device 400 to provide additional user input. A virtual keyboard can also be provided using the touch screen. A camera 422 located on the front (display screen) side or the rear side of the mobile device 400 can also be integrated into the housing 402 of the mobile device 400.

Figure 5:
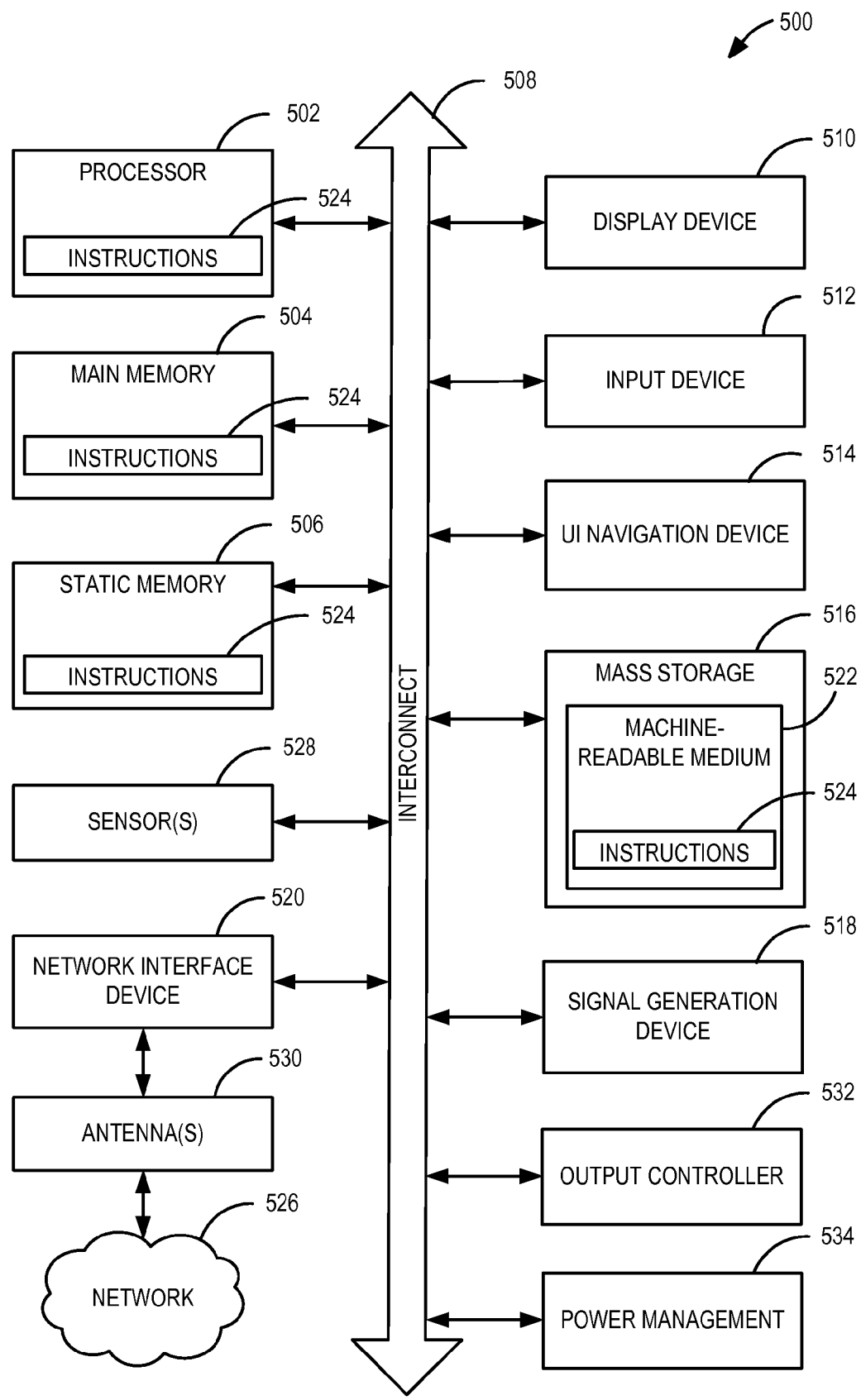
FIG. 5 illustrates an example computer system that can be used as a computing platform for the computing or networking devices described herein.

FIG. 5 is a block diagram illustrating an example computer system machine 500 upon which any one or more of the methodologies herein discussed can be run. Computer system machine 500 can be embodied as the UE 202, the eNB 204, the WLAN 206, or any other computing platform described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 500 includes a processor 502 (e.g., a central processing unit (CPU), a graphics processing unit (GPU) or both), a main memory 504 and a static memory 506, which communicate with each other via an interconnect 508 (e.g., a link, a bus, etc.). The computer system machine 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system machine 500 can additionally include a storage device 516 (e.g., a drive unit), a signal generation device 518 (e.g., a speaker), an output controller 532, a power management controller 534, and a network interface device 520 (which can include or operably communicate with one or more antennas 530, transceivers, or other wireless communications hardware), and one or more sensors 528, such as a Global Positioning Sensor (GPS) sensor, compass, location sensor, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system machine 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 524 can further be transmitted or received over a communications network 526 using a transmission medium via the network interface device 520 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method executed by a user equipment (UE) for initiating offloading from a cellular network to a WiFi network, the cellular network connecting through an evolved NodeB (eNB), the WiFi network connecting through a Wireless Local Area Network (WLAN), the method comprising:

sending a Power Preference Indication (PPI) message to the eNB to indicate that the UE has a low power;

receiving from the eNB an offload instruction for triggering the UE to offload to a single WLAN specified in the offload instruction, wherein the offload instruction includes a command to offload and a basic service set identification (BSSID) of the single WLAN and wherein the UE has not established a previous connection with the single WLAN prior to receiving the offload instruction;

scanning for the single WLAN specified in the offload instruction and associated with the received BSSID and refraining from scanning for other WLANs; and connecting to the single WLAN associated with the received BSSID by communicating an offload initiation instruction.

2. The method of claim 1, wherein receiving the offload instruction comprises sensing an adjustment in eNB policies.

3. The method of claim 1, wherein receiving the offload instruction comprises sensing an adjustment of a threshold value for Reference Signal Receive Power (RSRP).

4. The method of claim 1, further comprising:
receiving an adjusted threshold for Reference Signal Receive Power (RSRP) from the eNB;
determining that the UE no longer exceeds the threshold; and
initiating offloading to the single WLAN.

5. The method of claim 1, further comprising:
receiving from the eNB a reduced number of WiFi access points (APs); and
scanning for the reduced number of WiFi APs.

6. A user equipment (UE), comprising:
circuitry configured to initiate offloading from a cellular network to a WiFi network, the cellular network connecting through an evolved NodeB (eNB), the WiFi network connecting through a Wireless Local Area Network (WLAN), the circuitry arranged to:
send a Power Preference Indication (PPI) message to the eNB to indicate that the UE has a low power;
receive from the eNB an offload instruction for triggering the UE to offload to a single WLAN specified in the offload instruction, wherein the offload instruction includes a command to offload and a basic service set identification (BSSID) of the single WLAN and wherein the UE has not established a previous connection with the single WLAN prior to receiving the offload instruction;
scan for the single WLAN specified in the offload instruction and associated with the received BSSID and refrain from scanning for other WLANs; and
connect to the single WLAN.

7. The UE of claim 6, wherein receiving the offload instruction comprises sensing an adjustment in eNB policies.

8. The UE of claim 6, wherein receiving the offload instruction comprises sensing an adjustment of a threshold value for Reference Signal Receive Power (RSRP).

9. The UE of claim 6, wherein the circuitry is further arranged to:
receive an adjusted threshold for Reference Signal Receive Power (RSRP) from the eNB;
determine that the UE no longer exceeds the threshold; and
initiate offloading to the single WLAN.

10. The UE of claim 6, wherein the circuitry is further arranged to:
receive from the eNB a reduced number of WiFi access points (APs); and
scan for the reduced number of WiFi APs.

11. A method executed by an evolved NodeB (eNB) for initiating offloading of a user equipment (UE) from a cellular network to a WiFi network, the cellular network connecting through the evolved NodeB (eNB), the WiFi network connecting through a Wireless Local Area Network (WLAN), the method comprising:
receiving a Power Preference Indication (PPI) message from the UE to indicate that the UE has a low power;
based on the PPI message, transmitting to the UE an offload instruction for triggering the UE to initiate connection with and offload to a single WLAN specified in the offload instruction, wherein the offload instruction includes a command to offload and a basic service set identification (BSSID) of the single WLAN, and wherein the UE has not established a previous connection with the single WLAN prior to receiving the offload instruction; and
initiating connection of the UE to the single WLAN.

12. The method of claim 11, wherein transmitting the offload instruction comprises adjusting at least one eNB policy.

13. The method of claim 11, wherein transmitting the offload instruction comprises adjusting a threshold value for Reference Signal Receive Power (RSRP).

14. The method of claim 11, further comprising:
transmitting an adjusted threshold for Reference Signal Receive Power (RSRP) to the UE.

15. The method of claim 11, further comprising:
transmitting to the UE a reduced number of WiFi access points (APs).

16. An evolved NodeB (eNB), comprising:
circuitry configured to initiate offloading of a user equipment (UE) from a cellular network to a WiFi network, the cellular network connecting through the evolved NodeB (eNB), the WiFi network connecting through a Wireless Local Area Network (WLAN), the circuitry arranged to:
receive a Power Preference Indication (PPI) message from the UE to indicate that the UE has a low power; and
based on the PPI message, transmit to the UE an offload instruction for triggering the UE to initiate connection with and offload to a single WLAN specified in the offload instruction, wherein the offload instruction includes a command to offload and a basic service set identification (BSSID) of the single WLAN and wherein the UE has not established a previous connection with the single WLAN prior to receiving the offload instruction; and
initiate connection of the UE to the single WLAN.

17. The eNB of claim 16, wherein transmitting the offload instruction comprises adjusting at least one eNB policy.

18. The eNB of claim 16, wherein transmitting the offload instruction comprises adjusting a threshold value for Reference Signal Receive Power (RSRP).

19. The eNB of claim 16, wherein the circuitry is further arranged to:
transmit an adjusted threshold for Reference Signal Receive Power (RSRP) to the UE.

20. The eNB of claim 16, wherein the circuitry is further arranged to:
transmit to the UE a reduced number of Win access points (APs).

* * * * *

UNITED STATES PATENT AND TRADEMARK OFFICE
CERTIFICATE OF CORRECTION

PATENT NO. : 9,609,565 B2  
APPLICATION NO. : 14/109283  
DATED : March 28, 2017  
INVENTOR(S) : Koc et al.

Page 1 of 1

It is certified that error appears in the above-identified patent and that said Letters Patent is hereby corrected as shown below:

On the Title Page

On page 3, in Column 2, under "Other Publications", Line 9, delete "Optimalityof" and insert --Optimality of-- therefor On page 3, in Column 2, under "Other Publications", Line 51, delete "Connesctivty"," and insert --Connectivity",-- therefor On page 4, in Column 1, under "Other Publications", Line 3, after "pgs.", insert --¶--

On page 4, in Column 2, under "Other Publications", Line 11, delete "No," and insert --No.-- therefor In the Claims In Column 8, Line 58, in Claim 20, delete "Win" and insert --WiFi-- therefor Signed and Sealed this  
Fourth Day of June, 2019

Andrei Iancu  
*Director of the United States Patent and Trademark Office*